(No Model.)  2 Sheets—Sheet 1.

P. J. F. GRAEME.
LAMP BURNER.

No. 473,738.  Patented Apr. 26, 1892.

WITNESSES:
John W. Dumar
C. Sedgwick

INVENTOR:
P. J. F. Graeme
BY
ATTORNEYS.

(No Model.) 2 Sheets—Sheet 2.
P. J. F. GRAEME.
LAMP BURNER.
No. 473,738. Patented Apr. 26, 1892.
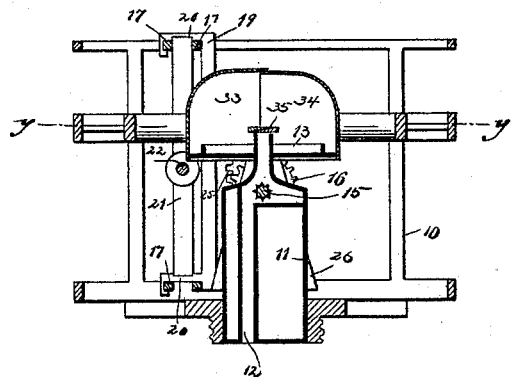
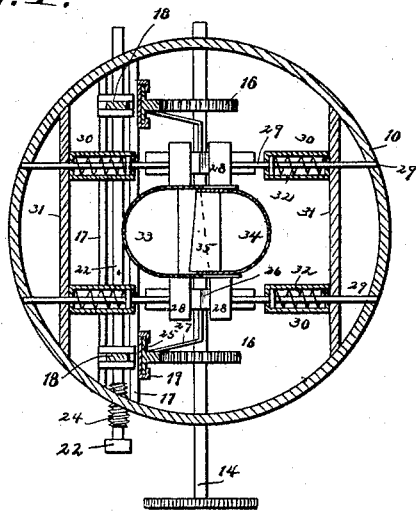
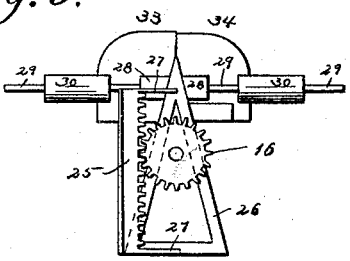
WITNESSES: INVENTOR:
P. J. F. Graeme
BY
ATTORNEYS.

UNITED STATES PATENT OFFICE.

PATRICK J. F. GRAEME, OF BEULAH, CANADA.

LAMP-BURNER.

SPECIFICATION forming part of Letters Patent No. 473,738, dated April 26, 1892.

Application filed June 19, 1890. Renewed August 25, 1891. Serial No. 403,705. (No model.)

*To all whom it may concern:*

Be it known that I, PATRICK J. F. GRAEME, of Beulah, in the Province of Manitoba and Dominion of Canada, have invented a new and Improved Lamp-Burner, of which the following is a full, clear, and exact description.

My invention relates to an improvement in lamp-burners, and has for its object to provide a means whereby the flame may be extinguished and the wick trimmed automatically upon lowering the wick, and also to provide a means whereby, when desired, the wick may be raised and lowered and the extinguishing and trimming mechanism not operated.

The invention consists in the novel construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1:
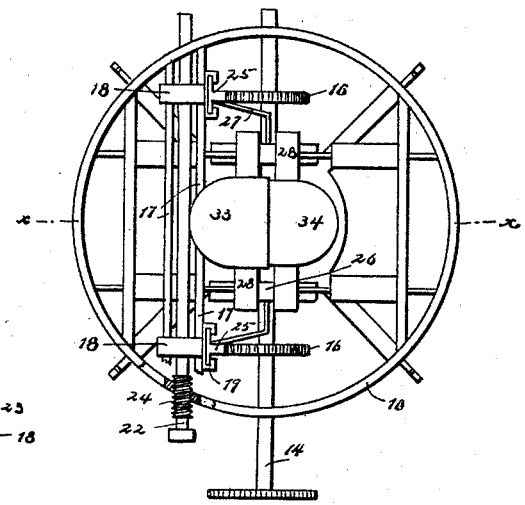
Figure 6:
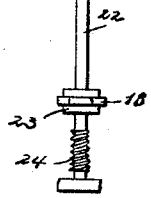
Figure 2:
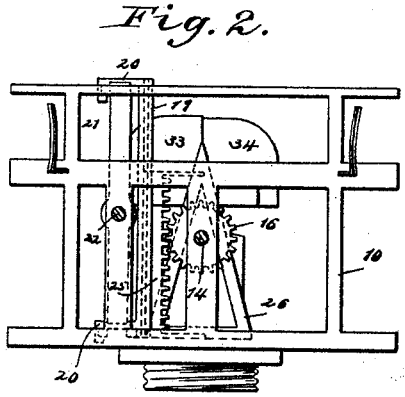
Figure 7:
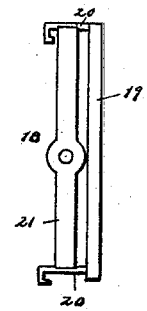

Figure 1 is a plan view of the burner. Fig. 2 is a side elevation. Fig. 3 is a central vertical section on line $x\,x$ of Fig. 1. Fig. 4 is a horizontal section on line $y\,y$ of Fig. 3. Fig. 5 is a side elevation of a portion of the extinguishing and trimming mechanism detached, and Figs. 6 and 7 are detail views of the shifting mechanism.

The body of the burner consists, preferably, of a circular skeleton frame 10, having secured vertically in the center thereof a wick-tube 11, threaded at the lower outer end for connection with the lamp. This wick-tube, as shown in Fig. 3, is ordinarily made narrower at its upper end than the remaining portion of its length and is provided in its interior with a channel 12 to facilitate the guidance of the wick when inserted at the bottom. To the upper narrow part of the wick-tube a tray 13 is rigidly secured, adapted for a purpose hereinafter set forth. Through the frame and wick-tube below the narrowed upper end of the latter the wick-spindle 14 is projected, having attached thereto within the tube a spur-wheel 15 for contact with the wick and a pinion 16 at each side of the wick-tube, as best shown in Fig. 4.

At one side of the wick-tube parallel with the wick-spindle and at or near the top and bottom of the frame two spaced guide-rods 17 are secured to the latter, each set of rods being in vertical alignment. Two slides 18 are adapted to travel upon the guide-rods, one of which is located near each end of the rods, and both slides occupy a vertical position. The slides are illustrated in side elevation in Fig. 7, and consist of a front plate 19, having a T-groove upon its inner face, as shown in Fig. 4, upper and lower angled arms 20, projected at a right angle from the extremities of the plate at the outer face, which arms are connected by a perpendicular bar 21, provided with an aperture at or near the center. When the slides are placed in position, the arms contact with the guide-rods 17, as shown in Fig. 1, and a spindle 22 is passed horizontally through the frame and through the central aperture in the slides, and the spindle is attached to the latter by lock-nuts 23, carried by the spindle, contacting with opposite faces of the bars 21 of the slides, as shown in Fig. 6. The slides are preferably made in one piece, and one end of the spindle 22 only is journaled in the frame, that portion of the opposite end passing through the frame being provided with an enlarged threaded surface 24, and the opening in the frame through which this enlarged surface passes is correspondingly threaded. In the grooved inner face of each slide a perpendicular rack 25 is inserted, capable of vertical movement in the slides 18, which racks are adapted for normal contact with the pinions 16 of the wick-spindle.

Between each pinion 16 and the wick-tube near the latter a triangular or wedge block or frame 26 is so placed that the base will be essentially upon a level with the lower ends of the racks 25, as best shown in Fig. 5, the said wedge-blocks being attached near the top and at the bottom to the extremities of the racks, perferably by horizontal connecting-bars 27. The wick-spindle passes through the wedge blocks or frames and the frame-blocks are usually so constructed that the base is equal to about one-half the altitude. A latch-head 28 contacts with each side of the wedge-block at the top, each having attached thereto a piston-rod 29, which passes through a cylinder 30, secured to a cross-bar 31, attached to the frame. (See Fig. 4.) Within each cylinder a spring 32 is coiled around each piston-rod, having a bearing against the outer end of the cylinder and a collar secured to the rod, which springs normally hold the latch-heads against the wedge-blocks.

To the opposed latch-heads at each side of the wick-tube hoods 33 and 34 are respectively secured, partly cylindrical and partly spherical, the left-hand hood being made slightly larger in diameter, so that they telescope in closing. The under surface of the hoods is provided with a flange whereby when closed the flange will neatly contact with the tray 13 and prevent any air being fed to the flame, thus extinguishing the latter. Each hood is provided with a knife 35, horizontally fastened upon the inner side, so shaped and located that when the hoods close the knives will trim the wick with a scissors-like cut.

In operation it will be observed that when the wick is raised by the wick-spindle the hoods will be forced apart, and when lowered sufficiently the hoods are closed, the flame automatically extinguished, and the wick is trimmed. By manipulating the adjusting-spindle 22 the racks 25 may be thrown out of engagement with the pinions 16, admitting of the burner being used in the ordinary manner.

Having thus described my invention, I claim as new and desire to secure by Letters Patent—

1. The combination, with the wick-tube of a burner and a triangular frame capable of vertical movement at each side of the same, of horizontal spring-actuated piston-rods arranged at each side of the said frames, each provided with a head-block contacting with the frames, and telescopic hoods secured to the said head-blocks inclosing the wick-tube, substantially as shown and described.

2. The combination, with the wick-tube of a burner and a triangular frame capable of vertical movement at each side of the same, of horizontal spring-actuated piston-rods arranged at each side of the said frames, each provided with a head-block contacting with the frames, telescopic hoods secured to the said head-blocks inclosing the wick-tube, and knives attached horizontally in the hoods capable of closing over the wick-tube, substantially as and for the purpose specified.

3. The combination, with the wick-tube of a burner and a triangular frame capable of vertical movement at each side of the same, of horizontal spring-actuated piston-rods arranged at each side of said frames, each provided with a head-block contacting with the frames, telescopic hoods secured to the head-blocks inclosing the wick-tube, and a horizontal knife having an inclined cutting-edge secured within each hood capable of contact over the wick-tube, substantially as shown and described.

4. The combination, with the wick-tube of a burner, a triangular frame capable of vertical movement at each side of the same, and horizontal spring-actuated piston-rods arranged at each side of the said frames, each provided with a head-block contacting with the frames, of telescopic hoods secured to the head-blocks inclosing the wick-tube, a horizontal knife having an inclined cutting-edge secured within each hood, said knives being capable of contacting over the wick-tube, and a tray secured to the wick-tube, adapted for peripheral contact with the base of the hoods, substantially as shown and described.

5. The combination, with the wick-tube of a burner and a triangular frame capable of vertical movement at each side of the same, horizontal spring-actuated piston-rods arranged at each side of the said frames, each provided with a head-block contacting with the frames, and telescopic hoods secured to the said head-blocks capable of inclosing the wick-tube, of a wick-spindle provided with a pinion at each side of the wick-tube, horizontal parallel guide-rods arranged in pairs, slideways having lateral movement upon the guide-rods, racks held to slide vertically in the said ways, meshing with the pinions of the wick-spindle, and connected with the triangular frame, and a shifting spindle rigidly secured to the slideways and journaled in the frame of the burner, substantially as shown and described.

6. The combination, with the wick-tube of a burner and a triangular frame capable of vertical movement at each side of the same, horizontal spring-actuated piston-rods arranged at each side of the said frames, each provided with an attached head-block contacting with the frames, telescopic hoods secured to the head-blocks inclosing the wick-tube, a horizontal knife secured within each hood capable of contacting over the wick-tube, and a tray secured to the wick-tube, adapted for peripheral contact with the hood, of a wick-spindle provided with a pinion at each side of the wick-tube, horizontal parallel guide-rods arranged in pairs located in one side of the wick-tube, slideways capable of lateral movement upon the guide-rods, racks held to vertically slide in the said ways, meshing with the said pinions, and connected with the triangular frames, and a shifting spindle rigidly secured to the said ways and journaled in the main frame of the burner, all combined for operation substantially as shown and described.

PATRICK J. F. GRAEME.

Witnesses:
JOHN G. TAYLOR,
C. O'CALLAGHAN.